Jan. 20, 1942.   G. F. JOHNSON   2,270,525
APPARATUS FOR HONING ROLLER BEARING CUP MEMBERS
Filed May 12, 1939   7 Sheets-Sheet 1

Inventor
Glen F. Johnson,
Attorney

Jan. 20, 1942.  G. F. JOHNSON  2,270,525
APPARATUS FOR HONING ROLLER BEARING CUP MEMBERS
Filed May 12, 1939  7 Sheets-Sheet 2

Inventor
Glen F. Johnson,
By
Attorneys

Jan. 20, 1942.   G. F. JOHNSON   2,270,525
APPARATUS FOR HONING ROLLER BEARING CUP MEMBERS
Filed May 12, 1939   7 Sheets-Sheet 3

Inventor
Glen F. Johnson,

Attorneys.

Jan. 20, 1942.    G. F. JOHNSON    2,270,525
APPARATUS FOR HONING ROLLER BEARING CUP MEMBERS
Filed May 12, 1939    7 Sheets-Sheet 4

Inventor
Glen F. Johnson,
By
Attorneys

Jan. 20, 1942.　　　G. F. JOHNSON　　　2,270,525
APPARATUS FOR HONING ROLLER BEARING CUP MEMBERS
Filed May 12, 1939　　　7 Sheets-Sheet 5

Inventor
Glen F. Johnson,
By Barthel & Barthel
Attorneys

Jan. 20, 1942.   G. F. JOHNSON   2,270,525
APPARATUS FOR HONING ROLLER BEARING CUP MEMBERS
Filed May 12, 1939   7 Sheets-Sheet 7

Inventor
Glen F. Johnson,
By
Attorneys

UNITED STATES PATENT OFFICE 2,270,525

APPARATUS FOR HONING ROLLER BEARING CUP MEMBERS

Glen F. Johnson, Detroit, Mich., assignor to Bower Roller Bearing Company, Detroit, Mich., a corporation of Michigan Application May 12, 1939, Serial No. 273,308

3 Claims. (Cl. 51—59)

This invention relates, in general, to methods of honing and apparatus therefor and, in particular, to a new and improved method and a new and improved centerless honing apparatus for honing the raceways of roller bearing members.

Machines for grinding the raceways of roller bearing members are known to exist, and the centerless type of machine is particularly well known and favored for grinding purposes. In this type of machine, and because the purpose of grinding is to size the work piece, the tool or grinding stone is definitely and positively held so as to prevent its recession from the work piece and so as to produce the approximately desired, though coarse, cylindrical (or conical) surface on said work piece. Both the work piece and the tool are rotated, and, in addition, the tool is reciprocated slowly toward, from and over the work, the reciprocation being necessarily slow, not only because of the sizing operation required thereof, but because of the massiveness of the table or body supporting it.

Attempts to employ a grinding machine of the above type, or of any other type, in the honing of the ground raceways have proved unsuccessful, principally because the process of honing is as different from the process of grinding as are the results of each. In the first place, there is no attempt made in a honing process to hold to any particular size, so that the honing tool or stone, instead of being held definitely and positively against the work, may be held resiliently or otherwise less positively. In the second place, a honing process does not require tool rotation, so that the tool carriage may be of lighter construction to enable, if desired, a much faster tool reciprocation than is capable of being produced in a grinding process. In the third place, the lack of necessity for sizing the work piece in a honing process creates a wider selectivity of supporting means for the work piece than is available in a grinding process, and this advantage is very important in view of the limitations afforded by a centerless machine. And, in the fourth place, the high machine speeds which are at present available demand the highly finished raceway surfaces that only a honing process can produce.

Regarding the relative merits of a work support for a honing operation and one for a grinding operation, where each must be centerless or chuckless, it is readily seen that the latter must include driving means for rotating the work piece above its axis in opposition to the severe braking action caused by the necessary sizing operation of the grinding tool, pressure means for maintaining said work piece against said driving means so as to insure the rotation of said work piece during said sizing operation, and additional means for maintaining said work piece in a single transverse plane normal to its axis of rotation so as to prevent the displacement thereof from the support during the grinding operation. On the other hand, in the work support for the honing operation, in the present instance, the above mentioned pressure means for the work piece may be disposed of, for it is proposed, in the first place, to carry the work piece against an idle backing member at an angle to the tool axis and to employ the effect of this angle and the resultant pressure of the tool which is exerted on the surface to be honed for holding said work piece in place against said backing member, and, in the second place, to drive the work piece about its axis of rotation by a pair of driven rollers which are supported for rotation about fixed axes and adjustable, preferably in diameter, so that the obtuse angle between the roller and work piece centers may approach 180°, whereby the angle existing between a line drawn through both roller centers and a line drawn through the work piece center and either roller center is reduced to a minimum and the driving force of the rollers upon the work piece increased to a maximum.

The angle residing between the axes of the tool and the supported work piece provides a convergent area, defined on one side by the honing surface of the tool and on the opposite side by the external surface of the work piece, in which the work piece, during the honing thereof, is positively confined and forcibly prevented from displacing itself from the backing member. The tool pressure, which is substantially solely exerted by resiliency, is so exerted against the lower portion of the work piece raceway and its resultant not only adds to the existing forces which cause the driving of the work piece but also prevents the unsupported upper portion of the piece from tipping away from the backing member.

The principal object of this invention is to provide a new and improved centerless honing machine and honing method which are operable and adapted for honing the ground raceways of roller bearing members and providing said raceways with a superiority of finish that will meet any present or future demand.

Another object of this invention is to provide a new and improved method of and apparatus for honing the raceway of a roller bearing member wherein each member to be honed is automatically fed into and held in honing position while the non-rotatable tool is automatically held out of position, and whereafter the tool is brought into position, the member honed and the latter then automatically replaced by the next member to be honed.

Another object is to provide a new and improved method of and apparatus for honing a bearing member raceway wherein the bearing member being honed is held substantially externally about its axis of rotation so that said member, when honed, may be readily and automatically replaced by the next member to be honed.

Another object is to provide a new and improved method of and apparatus for honing raceways of roller bearing members wherein the steps of feeding the members to the honing tool, honing them thereby, and then ejecting them therefrom are successively and automatically carried out and are so timed as to prevent jamming and other faults which would hinder continuous and efficient operation and output.

Another object is to provide a new and improved method of and apparatus for honing the raceway of a roller bearing member wherein the member is rotatably supported and maintained in position during the honing thereof more effectively and by the employment of fewer means than heretofore.

Another object is to improve the manners in which and the means whereby the work pieces in a honing operation are fed, held, honed and replaced so as to assure continuity, efficiency, speed and faultlessness in the operation as a whole as well as perfection in the finished products.

Another object is to provide a new and improved method of and apparatus for finishing roller bearing raceways whereby the surfaces of said raceways will be smoother, truer and more highly finished than heretofore and which will pass the severest inspection and meet the most critical demand.

Another object is to provide a new and improved honing apparatus which is automatic and efficient in operation, which is accurately timed for faultlessly receiving, working and ejecting the work, and which requires little or no attention in its functioning.

Another object is to provide a new and improved honing apparatus in which the work is automatically fed into and externally supported in honing position while the honing tool is automatically held out of position, whereafter the tool is automatically brought into honing position, the work honed and then automatically replaced by another piece of work to be honed, the cycle of operation being continuous, repetitive and accurately timed so as to prevent jamming and other faults which would hinder said continuity and injure output efficiency.

Another object herein is to provide in a honing apparatus a new and improved means for holding the work to be honed whereby said work can automatically attain the position for being honed and thereafter be automatically ejected therefrom and replaced by a new work piece to be honed.

Another object is to provide a new and improved apparatus for finishing the raceways of roller bearing members so that said raceways will be more highly finished and in which apparatus the honing tool may be more rapidly reciprocated, non-rotatively, than heretofore.

Another object is to provide a new and improved honing apparatus for the raceways of roller bearing members which is lighter in construction, automatic and more efficient in operation, and which has a wider range of used and a greater adaptation for different types of work supports, than heretofore.

Another object is to provide a honing apparatus with a new and improved bearing support for its reciprocable honing tool so that said tool will continue without adjustments or attention to move in accordance with its predetermined movements over long periods of operations.

Still other objects and advantages of the invention will become readily apparent from a reference to the following specification taken in conjunction with the accompanying drawings of which there are seven (7) sheets and wherein.

In Figs. 1 through 11 there is shown an apparatus, or figurative information pertaining thereto, for honing the internal raceways of roller bearing cup members. As will be seen subsequently, this apparatus is readily modified so as to enable the external raceways of roller bearing cone members to be honed, but, for the present, the discussion will be limited to the apparatus as it appears in said Figs. 1 through 11. The apparatus comprises a base framework, generally indicated at 10, for indirectly supporting the hone-carrying and work-carrying sections, generally indicated at 11 and 12, respectively, of the apparatus and also for providing a compartment 13 for housing the various cams and their driving means employed in conjunction with the operations of said apparatus sections. The portion of base frame 10 which is particularly devoted to the indirect support of the hone-carrying section 11 of the apparatus comprises a pair of spaced, longitudinally extending, parallel bosses 14 which are formed integral with the top of said base frame below said section and provided with axial bores 15. Intermediate the bosses 14 is formed in the top surface of the base frame 10 a pair of elongated slots 16 which slots are spaced laterally as well as longitudinally from each other (see Fig. 7). The portion of base frame 10 which is particularly devoted to the support of the work-carrying section 12 of the apparatus comprises a pair of spaced, longitudinally extending, parallel uprights 17 which uprights are formed integral with the top of said base frame below said section. Generally speaking, the two aforesaid portions of the base frame 10 are elevated above the general height of the compartment 13 defined by said base frame for properly receiving under each its respective set of the aforementioned cams. The usual lubricant pan 18 is provided and formed integral with the base frame 10, said pan, in general, surrounding said base frame and functioning in a manner typical thereof.

In each of the bores 15 provided in the bosses 14 formed on the base frame 10 is fixedly supported an elongated guide 19 which extends from a substantial distance outwardly of either end of its supporting boss, and mounted on the ends of said guides is a carriage, generally indicated at 20, said carriage having longitudinally bored boss formations 21 laterally spaced from the ends of bosses 14 and in axial alignment with said guides for freely receiving the ends of the latter and to be slidably supported thereby, the distance between the inner ends of either aligned pair of bosses 21 being less than the length of either of the guides 19 and the distance between the outer ends of either aligned pair of bosses 21 being greater than the length of either of the guides 19. Carriage 20, as is readily seen, is longitudinally reciprocable along its supporting guides 19 relatively to the base frame 10, and said carriage is integrally formed on its under surface with a pair of bosses 22 and 23 which extend substantially below the upper surface of the base frame 10 through the slots 16 therein for play therealong. Boss 22 is provided at its end in any suitable manner with a roller or caster 24 which is rotatable about an axis parallel with the longitudinal axes of guides 19. Boss 23 is provided with a vertical bore 25 extending therethrough, and in said bore there is freely mounted for vertical reciprocation relative to said boss a stem 26, the lower end of said stem being provided in any suitable manner for rotation about a transverse axis with a roller or caster 27, and the upper end of said stem passing upwardly through a bored boss 28 formed on the upper surface of the carriage 20, said upper end of said stem being provided with a head 29 which, among other functions to be later described, cooperates with boss 28 to limit the downward movement of stem 26.

Onto the upper surface of carriage 20, rearwardly of the upstanding boss 28 thereon, is mounted an elongated plate 30, said plate having formed therein an aligned pair of elongated slots 31 through which plate and slots extend bolts 32 which are threadedly engaged in the upper wall of said carriage. Slots 31 are parallel with the longitudinal axis of the guides 19 and permit plate 30, when bolts 32 are loosened from carriage 20, to be adjustably moved longitudinally with respect to said carriage, and said slots, on the other hand, prevent any turning of said plate in a horizontal plane with respect to said carriage. Horizontal turning of plate 30 is further prevented by the provision in said plate and the carriage 20 of a tongue and groove arrangement 33' (see Fig. 6). Bolts 32, when tightened, hold plate 30 in its selected adjusted position on and with respect to carriage 20. To aid the operator in obtaining precision in longitudinally adjusting plate 30 with respect to carriage 20 an upstanding boss 34 is integrally provided on said carriage adjacent the outer end of said plate and an adjusting bolt 35 is journalled at one end in said boss with its other end in threaded engagement with said end of said plate, so that manual turning of said bolt will move said plate along said carriage in a direction in accordance with the direction said bolt is turned. The plate 30 is integrally provided at each of its ends with an upright 36, said uprights forming axially aligned bearings for a pin 37 which is parallel with the guides 19 and extends outwardly at each end from said uprights.

The ends of pin 37 support a carrier 38 for pivotal movement about a horizontal axis which is parallel with the axes of guides 19, said carrier having axially aligned bearing portions 39 in which said pin ends are journalled. Carrier 38 extends forwardly from its supporting pin 37 for a substantial distance and is provided with a spring well 40 having an opening 41 in the bottom thereof through which opening a stem 42 projects. Stem 42 is threaded at both ends, one end being threadedly lodged in the plate 30, the other end carrying a washer-nut unit 43, and a coil spring 44 being arranged on said stem between the unit 43 and the bottom wall of well 40 for urging the carrier 38 downwardly about its supporting axis, the compression of said spring being adjustable by means of the nut of unit 43. The under surface of carrier 38 directly above the boss 28 formed on the carriage 20 is integrally provided with a boss 45 (see Fig. 5) which is threadedly bored to receive a set screw 46, screw 46 extending beyond the lower end of boss 45 and being vertically aligned with the head 29 of stem 26 mounted in the bosses 23 and 28 on carriage 20 so that upward movement of stem 26 relatively to said carriage engages the head 29 with the lower end of screw 46 and causes upward movement of carrier 38 about the axis of its supporting pin 37. On the upper surface of carrier 38 laterally of the axis of set screw 46 is rigidly mounted a driving motor 47 the drive shaft of which being adapted for rotation normally about a horizontal axis which is perpendicular to those vertical planes in which lie the axes of guides 19. It should be noted, however, that motor 47 is carried by the carrier 38 and that pivotal movement of the latter about the axis of pin 37 carries the former along with it. It should also be noted that, since the carrier 38 is supported by the plate 30, and since said plate is carried by the carriage 20, longitudinal adjustment of said plate relatively to said carriage by means of the adjusting bolt 35 at the same time longitudinally adjusts said carrier with respect to said carriage.

Figures 4, 10, 20:
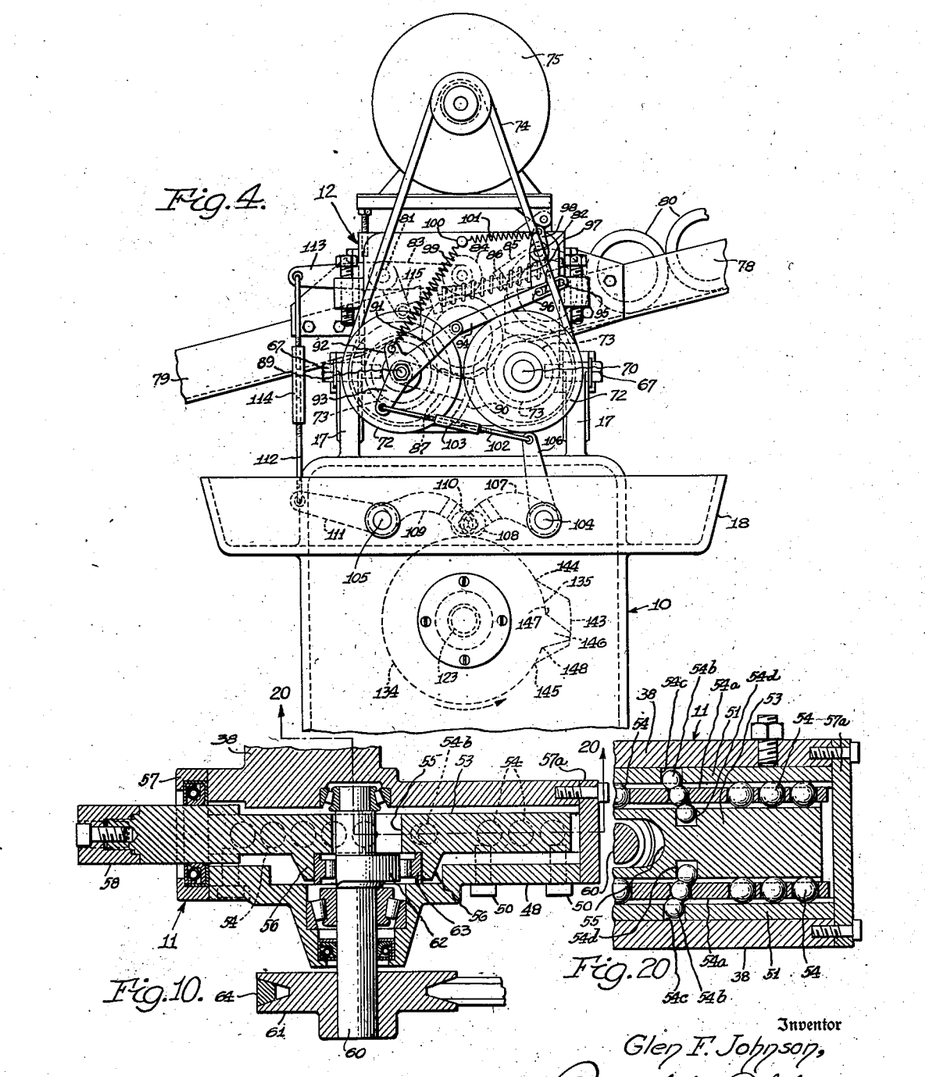
Figs. 4 and 5 are left and right end elevational views, respectively, of the apparatus of Fig. 1.
Figs. 6, 9 and 10 are enlarged sectional views taken along the lines 6—6, 9—9 and 10—10, respectively, in Fig. 1, and showing details of the tool-carrying section of the apparatus of Fig. 1.
Fig. 20 is a sectional view taken along the lines 20—20 in Fig. 10.
Figures 6, 9:
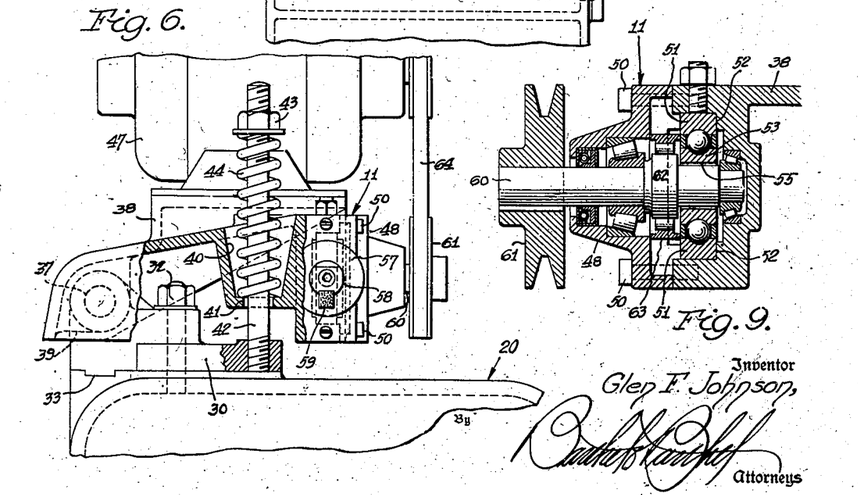
Figure 7:
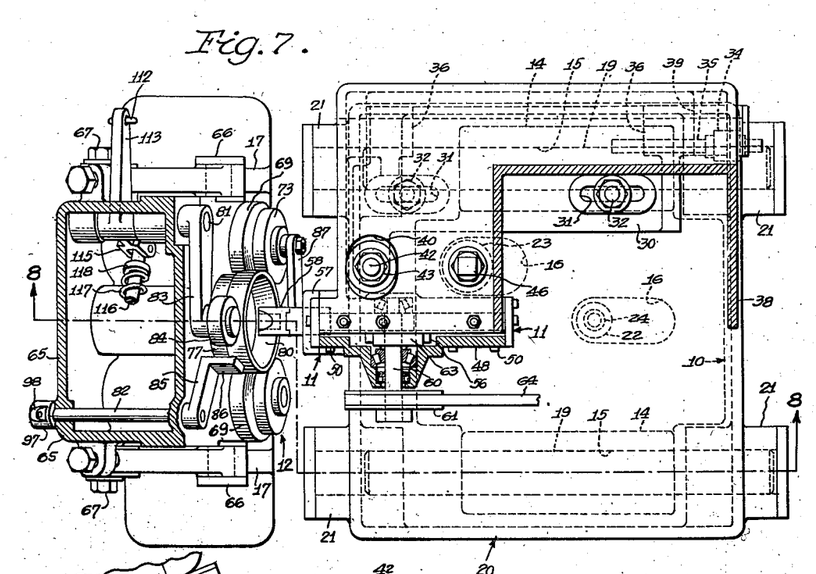
Fig. 7 is a plan view of the showing in Fig. 1, same being shown partly in section.

The actual hone-carrying portion of section 11 of the apparatus is directly carried by the forward wall of the carrier 38, as is clearly hown in Figs. 9, 10 and 20, and comprises an elongated housing member 48 which is formed for cooperation with said forward wall of carrier 38 to provide an elongated chamber therebetween the longitudinal axis of which being parallel with the axes of guides 19 and pin 37, said member and carrier wall being secured together by means of bolts 50. In this chamber is disposed a pair of elongated, normally stationary rails 51, said rails being parallel, vertically spaced, fitted against shoulder portions 52 provided therefor in the carrier 38, and held against forward displacement by the housing member 48. Arranged between the rails 51 is an elongated slide 53, and between said slide and each of the rails 51 is disposed a plurality of longitudinally aligned bearings 54 carried in a cage 54a for permitting substantially frictionless longitudinal movement of said slide relatively to said rails. Each cage 54a is controlled in its reciprocatory movement with respect to the stationary rail 51 thereadjacent and to the reciprocable slide 53 by means of an interconnecting link or toggle joint 54b which in each case is pivotally carried at one end in a recess 54c provided therefor in the adjacent rail 51, in driving engagement intermediate its ends with the cage 54a, and in driven engagement at its other end with a recess 54d provided therefor in the slide 53. Each of the links or toggle joints 54b may consist, as shown, of integrated ball members, or it may be of continuous cross section along its length, but, in any event, their use provides not only a guide for the cages 54a and their bearings 54 but also serves to halve the amplitude and speed of the cage movement with respect to the slide movement and otherwise to control the relative movements therebetween. Slide 53 is provided substantially centrally thereof with a longitudinally slotted opening 55 and forwardly of said opening said slide is formed with a pair of spaced parallel lugs 56. Slide 53 projects outwardly of the chamber at one end thereof through a packed opening provided in an end plate 57 secured to the carrier 38 and housing member 48, and to this projected end of said slide is rigidly secured in any suitable manner a tool or hone carrier 58 which carries a tool or hone 59, the other end of the chamber being closed by another end plate 57a.

Journalled in the carrier 38 and housing member 48 by suitable bearings is a shaft 60 the outer end of which shaft having mounted thereon for rotation therewith a pulley 61, the axis of said shaft being normally horizontal and perpendicular to the longitudinal axis of the slide 53. The portion of shaft 60 which is disposed within the area defined by the lugs 56 on slide 53 is eccentrically formed, as at 62, and the surface of said eccentric is in driving engagement with the inner bearing surface of an annular bearing 63 arranged about said eccentric within said lugs. It will be noted that the diameter of the eccentric 62 is slightly less than the length of the slotted opening 55 in slide 53 so that rotation of shaft 60 and the resulting reciprocation of said slide due to the camming action of said eccentric upon lugs 56 through bearing 63 does not cause interference between said shaft and the end walls of said slot at either limit in the movement of said slide. A drive belt 64 interconnecting the pulley 61 and the drive shaft of motor 47 furnishes the rotative power for the shaft 60 so that the eccentric 62 may reciprocably drive the slide 53, such reciprocation of said slide being, of course, relative to and independent of the carrier 38 and along an axis parallel with the axes of guides 19 for the carriage 20.

Figure 3:
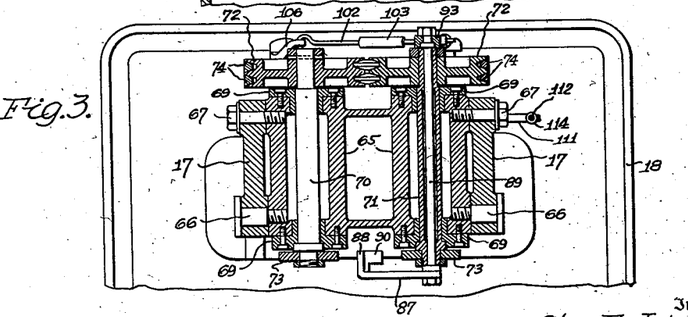
Fig. 3 is a sectional view taken along the lines 3—3 of Fig. 2.

Referring now particularly to the work-carrying portion 12 of the apparatus, said portion comprises a casing 65 which is mounted between the uprights 17 at one end by means of axially aligned pivot pins 66 which permit movement of said casing about a horizontal axis which is perpendicular to the vertical plane which includes the longitudinal axis of the slide 53 which reciprocably carries the tool 59, said casing being adapted for security in any selectively adjusted position by means of set screws 67 which pass through arcuate slots 68 provided therefor in said uprights and into threaded engagement with said casing at the opposite end thereof. The two end walls of casing 65 carry bearings 69 (see Fig. 3) in one pair of which bearings is journalled a shaft 70 and in the other pair of which bearings is journalled a shaft 71, shaft 71 being hollow. Though the axes of shafts 70 and 71 are shown as being parallel, in vertical planes which are parallel with and on opposite sides of the vertical plane which includes the longitudinal axis of the slide 53, spaced equally from said latter plane, and equiangularly disposed with respect to the horizontal, it will subsequently become clear that said axes may be arranged out of parallelism, the present discussion, however, being limited to the apparatus having a parallel shaft arrangement. On one end of each of the shafts 70 and 71 outwardly of casing 65 is mounted for rotation therewith a driving pulley 72 and on the other end of each of said shafts outwardly of said casing is mounted for rotation therewith a driven roller 73, said rollers having predetermined and preferably similar diameters and being shown in the present instance, purely for the purpose of illustrating one form of the apparatus, with plain rolling surfaces, and said pulleys each being driven in the same rotative direction by means of a common belt 74 which is in driven connection with the drive shaft of a motor 75 tiltably mounted (for belt-tightening purposes) on the upper surface of casing 65.

In the casing 65 is supported in the ordinary bearings an idler shaft 76 (see Fig. 8), the axis of said shaft being disposed above the axes of shafts 70 and 71 and substantially equally spaced therefrom and in parallelism therewith. It will later become clear that the choice of parallelism between the shafts 70, 71 and 76 is optional and has been made simply to provide a basis for disclosing one form of apparatus. The end of shaft 76 adjacent the ends of shafts 70 and 71 which support rollers 73 projects outwardly of casing 65 and is fixedly and centrally provided thereon with a cup-shaped backing member 77, said member in the instance under discussion having an axis in alignment with the axis of shaft 76 and the rim of said member presenting a true, planar backing surface against which the work (to be presently described) is supported and which surface lies in a plane perpendicular to the axes of shafts 70 and 71 and adjacently behind the rollers 73 thereon.

To that side of casing 65 which is adjacent the rollers 73 and backing member 77 is secured by any suitable means a pair of channel formations 78 and 79, said channels being inclined in the same direction and running transversely of the axis of said backing member and slightly thereahead. Channel 78 is so arranged as to serve as the work feeder, its discharge end being open and disposed at a lower level than its opposite end and terminating at a position above the front roller 73 and in front of the backing member 77 so that, when the work piece 80 rolls down said feeder by gravity, said work becomes positioned against said backing member and upon the rollers 73 to be rotatively driven by the latter. Channel 79 is so arranged as to serve as the work discharger, its inlet end being open and disposed at a higher level than its opposite end and in alignment with and at substantially the same level as the discharge end of the feeder 78, said inlet end of said work discharger being positioned above the rear roller 73 and behind the backing member 77 so as to provide a proper space between the members 78 and 79 for admission of the work to the rollers from the feeder and emission therefrom to the discharger. Channel formations 78 and 79 are shown as comprising angle rails assembled together, the purpose being to provide means whereby the cross sectional area of the runways defined thereby can be adjusted for accommodating work pieces of various widths, and, although said means are not shown, they may comprise slots in one of the angle pieces of each channel and set screws in association with said slots in the other of said angle pieces, one only of said pieces naturally being secured to the casing 65. Those angle pieces which are secured to casing 65 may, if desired, be so secured as to permit adjustment of the channels toward and away from the backing member 77.

Journalled in the end walls of casing 65 and projecting outwardly therefrom is a pair of spaced shafts 81 and 82, said shafts being disposed above the backing member 77 and on opposite sides thereof, the axes of shafts 81 and 82 being parallel to each other and, in the present instance, to the axes of shafts 70, 71 and 76. On that end of shaft 81 which is adjacent the tool-carrying portion 11 of the apparatus is fixedly secured for movement therewith a forwardly directed pressure arm 83, said arm carrying a roller 84 which is disposed laterally of the backing member 77 and above the work piece 80 backed up thereby, said roller being operable for holding said work piece in firm contact with the rotating rollers 73 so that said work piece can be rotatably driven thereby about the axis of said work piece. It will be learned later that the pressure roller 84, its support and its actuating means may, if desired, be dispensed with when the apparatus is employed for honing the internal raceways of roller bearing cup members, and it will also be learned that their dispensation is quite necessary when the apparatus is employed for honing the external raceways of roller bearing cone members. On the corresponding end of shaft 82 is fixedly secured for movement therewith a rearwardly directed tripper arm 85 having a laterally extending flanged section 86 which is normally disposed in the path of that work piece 80 which is next to leave the feeder channel 78 to become honed by the tool 59, said flange 86 being arcuately movable about the axis of its supporting shaft 82 for releasing at the proper time that work piece directly held thereby and for holding against discharge from the feeder until the proper time that work piece next in line.

Employed in conjunction with the above described pressure arm 83 and its roller 84 and the tripper arm 85 and its flange 86 is a kicker arm 87 having a work engaging flanged section 88 (see Fig. 3), said arm being fixedly mounted on the proper end of a shaft 89 which is freely carried concentrically within the hollow shaft 71. The work engaging section 88 of kicker arm 87 is disposed below the work piece 80 being rotated by the rollers 73 and honed by the tool 59 and is operable at the proper time for raising said work piece from said rollers and discharging same into the discharge channel 79, said section 88, if desirable, being extended downwardly from the arm 87 for a substantial distance, as at 90, for preventing inadvertent discharge of the next work piece from the feeder channel 78 while said arm is at its highest position.

Figures 2, 21:
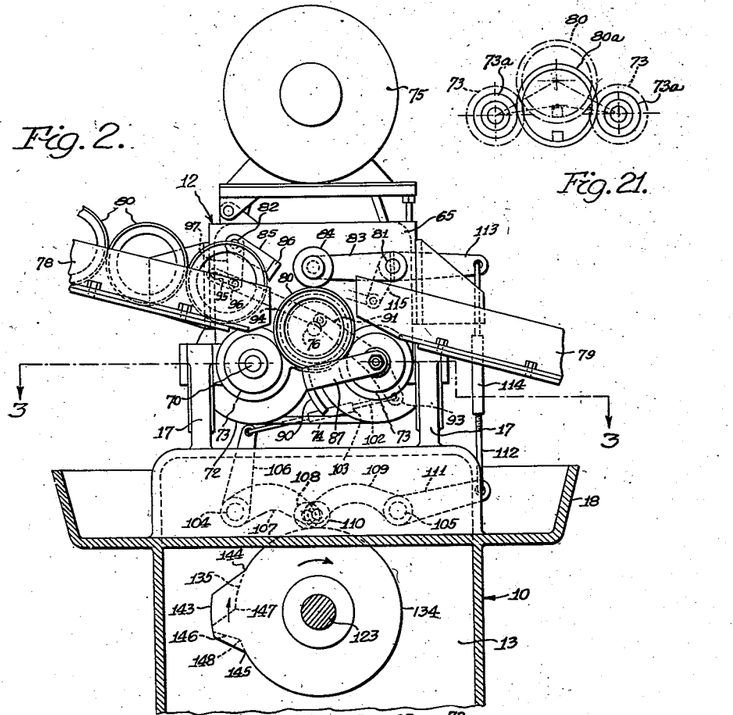
Fig. 2 is a right end elevational view, partly in section, of the work-carrying section of the apparatus of Fig. 1.
Fig. 21 is a detail showing a pair of relative positions for the driving rollers and work piece, the position shown in full lines being more effective than the position shown in dot-dash lines.

On the end of shaft 89 opposite the end thereof carrying the kicker arm 87 is rigidly mounted for movement therewith a triple-armed lever having angularly disposed arms 91, 92 and 93 (see Figs. 2 and 4). One end of a link 94 is pivotally connected to arm 91 of lever 91—92—93, said link being longitudinally slotted at its other end, as at 95, to receive a pin 96 formed on a double-armed lever having arms 97 and 98, pin 96 being formed on arm 97 and said double-armed lever 97—98 being fixedly mounted on and for rotation with the end of shaft 82 opposite the end thereof which carries the tripper arm 85. One end of a spring 99 (see Fig. 4) is connected to arm 92 of the triple-armed lever 91—92—93, the other end of said spring being anchored to the casing 65, as at 100, said spring constraining said lever in a clockwise direction, as shown in Fig. 4. To the anchor 100 is also secured one end of a second spring 101, the other end of said spring being connected to the arm 98 of the double-armed lever 97—98, said spring constraining said lever in a counter-clockwise direction, as shown in Fig. 4. Into the third arm 93 of the triple-armed lever 91—92—93 is hooked one end of a connecting rod 102, the other end of said rod to be presently described and said rod intermediate its ends being provided with any one of the well known types of turnbuckles 103 for varying at will the length of said rod.

Figure 1:
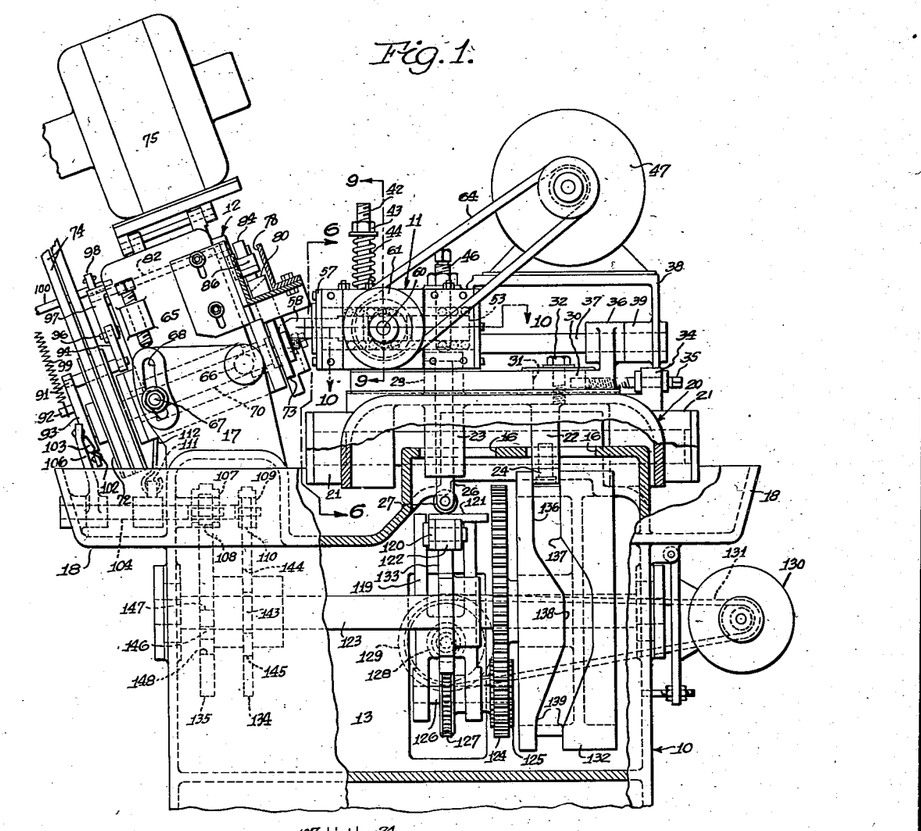
Figure 1 is a front elevational view of one form of the honing apparatus, shown partly in section and being partly broken away to illustrate more clearly the arrangement of parts and the details of their construction.

Journalled in the side walls of base frame 10 and lubricant pan 18, below the work-carrying section 12 of the apparatus, is a pair of shafts 104 and 105, said shafts being parallel and in a horizontal plane and free to oscillate about their axes (as will later be described). A lever 106 is fixedly mounted on and for movement with the shaft 104 and to the free end of this lever is connected the free end of the connecting rod 102. Shafts 104 and 105 extend inwardly of the frame 10, and on the inner end of shaft 104 there is fixedly mounted for movement therewith another lever 107, said lever being rearwardly directed and provided at its free end with a roller 108 which is pivotally mounted for movement about a floating axis parallel with the axes of shafts 104 and 105. On the inner end of shaft 105 there is fixedly mounted for movement therewith a lever 109, said lever being forwardly directed and provided at its free end with a roller 110 which is pivotally mounted for movement about a floating axis parallel with the axis of roller 108. As shown in Fig. 1, the levers 107 and 109 are laterally spaced, and, as shown in Figs. 2 and 4, the rollers 108 and 110 which are carried by said levers, respectively, are adaptable for normally assuming an almost coaxial alignment which, of course, exists only in the particular positions thereof shown in said figures, the rollers departing from said alignment upon movement of said levers.

Whereas the outer end of shaft 104 is provided with the lever 106, the outer end of shaft 105 is provided fixedly thereon for movement therewith with a lever 111 to the free end of which lever is connected one end of a connecting rod 112. The other end of rod 112 is connected to a lever 113 which is fixedly mounted on and for movement with the shaft 81 which carries the pressure arm and roller 83—84. Rod 112 is provided intermediate its ends with a turnbuckle 114 similar in construction to turnbuckle 103 and operable for selectively varying the length of rod 112. Lever 113 has integrally formed thereon a bifurcated bracket 115 (see Figs. 4, 7 and 8) which is movable with said lever about the axis of shaft 81 and to which bracket is pivotally mounted one end of a connecting rod 116. Rod 116 extends forwardly from the bracket 115 and projects outwardly through an opening provided therefor in the casing 65, said rod being provided telescopically with a coil spring 117 the ends of which abut the inner wall of said casing and a stop member 118 fixed on said rod, the function of this arrangement being to urge the pressure roller 84 into contact with the work piece 80 being honed by the tool 59 and to oppose movement of said roller away from said work piece.

Figure 5:
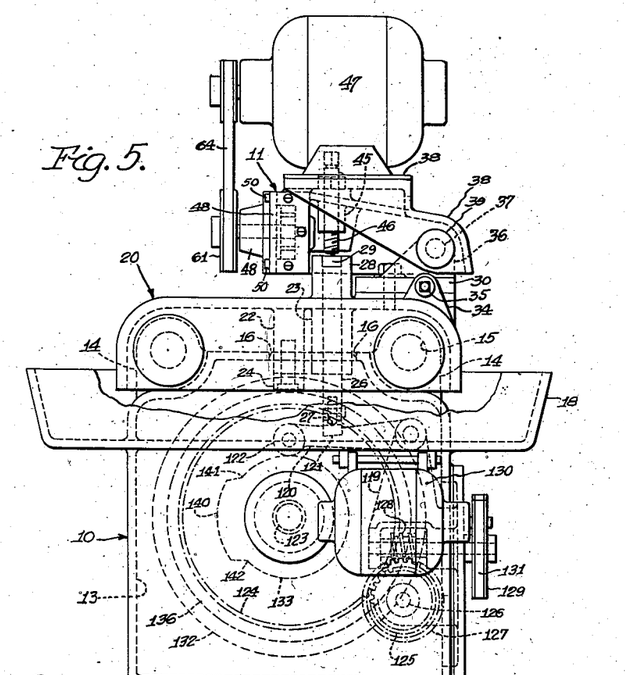

Referring now particularly to Figs. 1 and 5, the base framework 10 has fixed to its rear wall an upstanding bracket 119 the upper end of which bracket forms a support for one end of a forwardly extending lever 120, lever 120 being pivotally supported thereby for movement about a floating axis parallel with the axes of guides 19. Lever 120 is disposed below the roller 27 supported on the lower end of the vertically reciprocable stem 26 and is formed directly thereunder with a laterally extending guide plate 121 along which the roller 27 may roll during lateral movement of the carriage 20 which carries the stem 26. The free end of lever 120 is provided with a roller 122 which is so mounted on said lever as to move about an axis which is parallel with the pivotal axis of said lever.

Still referring to Figs. 1 and 5, the end walls of base framework 10 have journalled therein the ends of a main camshaft 123, the axis of shaft 123 being horizontal and parallel with the axes of guides 19 which support the carriage 20 for sliding movement therealong, shaft 123 carrying the cams which will presently be described. Shaft 123 has mounted thereon for movement therewith a large driving gear 124 therefor. In mesh with driving gear 124 for shaft 123 is a pinion 125 which is keyed or otherwise secured to an end of a shaft 126 supported for rotation about its axis by a lower portion of the bracket 119 which supports the lever 120. In spaced relation to the pinion 125 on shaft 126 and keyed thereto for driving same is a worm wheel 127 which is arranged to be driven by a worm 128 also supported by the bracket 119 but, of course, about an axis normal to the axis of worm wheel 127. The worm 128 has an elongated axle upon which is fixedly mounted a pulley 129, and there being a motor 130 provided for driving the worm 128 through a belt drive 131 operatively connected to the pulley 129. Motor 130 is mounted on the side of the framework 10, preferably in a manner to enable ready belt tightening, such as has already been described with reference to motors 47 and 75. To summarize the subject-matter in this paragraph, the motor 130 drives the worm 128 through the belt 131 and pulley 129, said worm drives the worm wheel 127 which is fixedly mounted on the shaft 126, said shaft drives the pinion 125 which is fixedly mounted thereon, said pinion drives the large gear 124, and said gear drives the camshaft 123.

Fixedly mounted on the cam shaft 123 for rotation therewith is a set of four cams 132, 133, 134 and 135. The cams are, in general, centrally mounted with respect to themselves on the shaft 123 and laterally spaced from each other, cam 132 underlying the roller 24 supported by the boss 22 on the carriage 20, cam 133 underlying the roller 122 which is mounted on the lever 120 and which lever in turn is pivotally supported by the bracket 119 and in contact with the roller 27 mounted on the vertically reciprocable stem 26 supported in the bore 25 formed in the boss 23 on the carriage 20, cam 134 underlying the roller 110 (see Fig. 1) which is supported on the lever 109 mounted on the shaft 105, and cam 135 underlying the roller 108 (see Fig. 1) which is supported on the lever 107 mounted on the shaft 104. Each cam will now be taken up separately for the purpose of clarity.

Cam 132, which underlies the roller 24, has an annular circumferential groove 136 through a major portion of the centerline of which groove a vertical plane may be imposed and which plane will be perpendicular to the axis of its supporting shaft 123. Groove 136 is continuous along the circumference of cam 132 and includes a portion which departs laterally of said plane in the direction of the axis of said shaft, said portion (see Figs. 1 and 11) comprising a commencement point 137 therefor, a straight run 138 thereof which is parallel with said plane, and an end point 139 of said portion. Into this circumferentially continuous groove 136—137—138—139 on cam 132 fits the roller or caster 24, and, since said roller or caster is mounted on the movable carriage 20, rotation of the main cam shaft 123, which carries the cam 132, initiates lateral movement of said carriage when the commencement point 137 in said groove engages said roller. Lateral movement of the carriage 20 continues until the straight run 138 in the groove 136 is entered by the roller 24, whereafter and during the engagement of said roller with said straight run further lateral movement of said carriage ceases. At the end of the straight run 138 in the groove 136 the return stroke of the carriage 20 begins and continues until the end point 139 in said groove reaches the roller 24, whereafter and until the commencement point 137 in said groove again reaches said roller the carriage 20 remains non-reciprocable. For the purpose of illustration the camshaft 123 is shown, looking from right to left in Fig. 1, as being rotatable in a clockwise direction. This means that engagement between the commencement point 137 in the groove 136 on cam 132 and the roller 24 drives the carriage 20 along the guides 19 to the right (as seen in Fig. 1), thereby withdrawing the tool 59 from the work piece 80 being honed thereby, said tool being carried by the carrier 38, and said carrier being carried by the carriage 20. For this reason the cam 132 will be termed the tool reciprocating cam. Naturally, one complete cycle of carriage reciprocation occurs upon each complete revolution of the cam shaft 123. The proper and predetermined locations of the discussed portions of the groove 136 in the cam 132 with respect to each other and to the roller or caster 24 reciprocably driven thereby will soon become apparent as to the desired timing of their co-actions with said roller.

Figure 11:
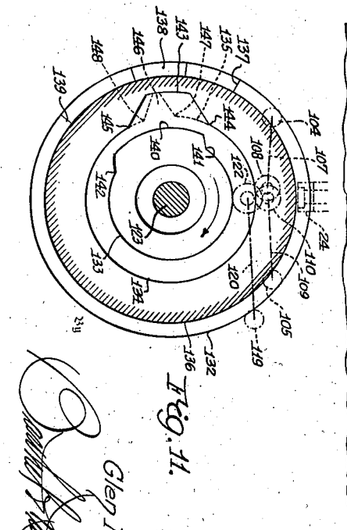
Fig. 11 is a diagrammatical view showing the relative operative positions of the cams for driving the two major sections of the apparatus of Fig. 1.

The cam 133, which underlies the roller 122 and is driven by the camshaft 123, said roller being carried on the end of the pivoted lever 120, and said lever having the guide plate 121 which engages the roller 27 on the lower end of the stem 26, is a disc-like member of constant diameter except for a high part 140 which begins, with respect to its rotative travel, at 141 on the peripheral surface of said cam and ends at 142. Since the cam 133 cooperates with roller 122 on the pivoted lever 120, and since the plate 121 on said lever cooperates with the roller 27 on the lower end of the stem 26 which is reciprocably mounted in the bore 25 formed in the boss 23 on the carriage 20, engagement between the roller 122 and the high part 140 on said cam causes upward movement of said stem, the head 29 of said stem engaging the lower end of the set screw 46 mounted in the carrier 38 and forcing said carrier upwardly about the pivotal axis of its supporting pin 37. This pivotal movement of the carrier 38 is relative to the carriage 20 supporting it and is opposed by the spring 44 (see Fig. 6), said spring assuring the return of said carrier to its normal position when the end 142 of high part 140 on cam 133 reaches the roller 122. A complete upward and downward pivotal movement of the carrier 38 naturally occurs upon each complete revolution of the camshaft 123, and because the cam 133 causes this pivotal movement of the carrier 38, which carries the tool 59, said cam will be termed the tool lifting cam. Reference to Fig. 11, which shows a diagrammatical grouping of the cams 132, 133, 134 and 135 as they would be seen if viewed from the right side of Fig. 1, discloses that, if two radial lines are drawn from the center of the shaft 123, one through the commencement point 137 of the camming portion on cam 132 and the other through the beginning point 141 of the high part 140 on cam 133, the latter radial line would lie angularly ahead of the former radial line with respect to the already assumed clockwise movement of the shaft 123, thereby indicating that the tool is raised from the work by the tool lifting cam 133 before the tool is withdrawn from the work by the tool reciprocating cam 132. This prevents the honed surface of the work from being axially scratched by the withdrawing of the tool therefrom. Also, a radial line drawn through the center of shaft 123 and the end point 142 of the high part 140 on cam 133 would lie angularly behind a radial line drawn through the center of said shaft and the end point 139 of the camming portion on cam 132, which indicates that the tool, by means of the cam 132, will be in a position overlying the surface of the work piece to be honed when the tool is ready to be lowered thereupon by the camming action of the cam 133. In short, the cam 132—136—137—138—139 is cooperable with the carrier 20 and the cam 133—140—141—142 is cooperable with the carriage 38 so that the tool 59, which is being rapidly reciprocated by the eccentric 62 (see Fig. 10), is lowered onto the work piece 80 after the carriage movement toward the left (see Figs. 1, 7 and 8) has been completed and is raised from said work piece before the carriage movement toward the right is commenced.

Directly after the tool-carrying carrier 38 is raised by the tool-lifting cam 133 and the carrier-carrying carriage 20 moved away from the work to the right by the tool-reciprocating cam 132, the pressure roller 84 (if same is being employed), which is pressing against the work piece 80 being then carried by the rotating rollers 73, should be raised away from said work piece. This is accomplished by the cam 134 which is supported for rotation on and with the camshaft 123 and which cam underlies the roller 110 supported on the lever 109, said lever being fixedly mounted on the shaft 105 which also fixedly carries the lever 111. Cam 134 is disc-like in general and has a uniform diameter except for a high part 143 which begins at 144 and ends at 145. The beginning point 144 of high part 143 on cam 134 is so arranged as to engage the roller 110 after the commencement points 141 and 137 of cams 133 and 132, in this stated order, have begun their camming actions, and the resultant camming action of the cam 134 upon the roller 110 causes the lever 111 to move downwardly about the axis of its supporting shaft 105 and pull (through rod 112 and lever 113) the roller-carrying end of pressure arm 83, which carries the pressure roller 84, upwardly about the axis of its supporting shaft 81. This upward movement of the pressure roller-carrying end of arm 83 is in opposition to the pressure of the spring 117 due to the compression thereof by the movement of the bracket 115 simultaneously with said movement of said arm. Reference to Fig. 11 shows that the camming action of the high part 143 on cam 134 with the roller 110, in terminating at 145, causes the pressure roller 84 to be lowered before the camming actions of the cams 133 and 132 have terminated, that is, before the tool has been both horizontally and vertically returned to its honing position. Cam 134, because of its function, will be termed the pressure roller lifting cam. In short, the cam 134—143—144—145 cooperates with the pressure arm 83 to raise the pressure roller 84 from the honed work piece 80 after the tool 59 has been vertically raised from said piece by the cam 133—140—141—142 and laterally moved therefrom by the cam 132—136—137—138—139 and to lower said pressure roller onto a new work piece 80 before said tool is laterally returned to and vertically lowered upon the raceway of said new piece.

During the engagement between the roller 110 and the high part 143 on the pressure roller lifting cam 134 the work piece 80, which has been honed by the tool 59, should be ejected from its position on the driven rollers 73 so that said ejectment will occur while the pressure roller 84 is in elevated position and when the tool itself is elevated and laterally spaced from its normal honing position. This is accomplished by the cam 135 which is mounted on and for rotation with the camshaft 123 and which cam underlies the roller 108, said roller being carried by the lever 107 which is fixedly mounted on the shaft 104, there being the lever 106 which is also fixedly mounted on the shaft 104 and movable in accordance with the movement of lever 107. Cam 135 is disc-like in general and has a uniform diameter except for a high part 146 thereon, said high part beginning at 147 and ending at 148. Engagement between the high part 146 on cam 135 and the roller 108 causes forward movement of the rod-carrying end of lever 106 about the axis of its supporting shaft 104 (see Figs. 2 and 4), and this forward movement of said lever draws the connecting rod 102 forwardly, thus causing clockwise movement (as viewed in Fig. 2) of the triple-armed lever 91—92—93 to the arm 93 of which said rod is connected and which lever is fixedly mounted on its supporting shaft 89. This movement of the lever 91—92—93 performs two functions, the first in time of which will be discussed. On the shaft 89 which supports and is driven by the triple-armed lever is fixedly mounted for rotation therewith the kicker arm 87 which has the flanged portion 88 underlying the work piece 80 being supported by the rotating rollers 73. Therefore, when the beginning point 147 of the high part 146 on the cam 135 engages the roller 108, the free end of kicker arm 87 is raised about the axis of its supporting shaft 89 and ejects the work piece 80 then being supported by the rollers 73 from said rollers into the discharge trough 79. This ejectment of the honed work piece 80 occurs, as is seen in Fig. 11, during the combined camming actions of the straight run 138 in the groove 136 on the tool reciprocating cam 132 upon the roller 24, the high part 140 on the tool lifting cam 133 upon the roller 122, and the high part 143 on the pressure roller lifting cam 134 upon the roller 110. In other words, the honed work piece 80 is ejected from its driven supporting rollers 73 into the discharge trough 79 by the kicker arm 87 while the pressure roller-carrying arm 83 is in its uppermost position and while the tool carrier 58 and tool 59 are also in their uppermost positions and at their maximum lateral displacement from honing position. As is seen further in Fig. 11 (by the aforementioned employment of radial lines drawn from the center of shaft 123 through points such as 139, 142, 145 and 148, which are the end points, respectively, of the cams 132, 133, 134 and 135, respectively), the end point 148 of the high part 146 on cam 135 lies ahead, in point of time, of the end points 139, 142 and 145, thus indicating that the kicker arm 87 is returned to its normal position before the pressure arm 83 is lowered into operative position or the tool returned both vertically and horizontally to its honing position.

Reference to Figs. 2 and 4 indicates that, when the triple-armed lever 91—92—93 actuates the shaft 89 to raise the kicker arm 87 to eject the honed work piece 80, the arm 91 of said lever to which is pivotally connected one end of the link 94 draws said link rearwardly. The opposite end of link 94 has the play connection 95 with the pin 96 which is a part of the arm 97 of the double-armed lever 97—98, and when said play is completed the resulting direct connection between said link and said pin causes upward movement of the flanged end 85 of the tripper arm 85 about the axis of the shaft 82 onto which said double-armed lever and said tripper arm are fixedly mounted for movement therewith. The purpose of this play connection 95—96 is to permit the kicker arm 87 to be raised before the tripper arm 85 is raised, so that there will be a complete ejection of the honed work piece 80 from the rollers 73 before a new work piece is introduced thereto. The movement of the tripper arm 85 is in opposition to the spring 101 and is just sufficient to permit a work piece to roll therepast, and the return of said tripper arm to its normal position is commenced before the kicker arm is returned to its own normal position, because of the tension of spring 101, so that the lower extension 90 of the kicker arm aids in preventing the next work piece in line in the feeder trough 78 from rolling past the lowering (or ready-to-be-lowered) tripper arm. It will be noted in Figs. 4 and 11 that the actuating cam 135—146—147—148 for the kicker and tripper arms 87 and 85 goes into operation after the pressure roller 84 has been raised and that it ceases operating before the roller is lowered. The cam 135—146—147—148 functions, therefore, to permit the ejection of finished work from the rollers 73 into the discharge trough 79 and the introduction of new work from the feeder trough 78 onto the rollers 73 without interferences or jamming. This cam 135—146—147—148 will be termed the kicker-tripper cam.

In operation, the motor 47 reciprocably drives the non-rotatable tool 59 independently of the carriage 20 and carrier 38 through the agency of the eccentric shaft 60—62 at the desired speed, the cages 54a frictionlessly carrying the tool-supporting slide 53 and being controlled and limited in their movement by the links or toggle joints 54b; the motor 75 rotatably drives the shafts 70 and 71 which carry the work-driving rollers 73; and, the motor 130 rotatably drives the main camshaft 123 which carries the cams 132—136—137—138—139, 133—140—141—142, 134—143—144—145, and 135—146—147—148. The tool-reciprocating cam 132—136—137—138—139 operates, during a complete revolution, to move the carriage 20, carrier 38 and reciprocating tool 59 in a horizontal plane (which is disposed above the honing plane) whereby the tool is moved into and out of the area defined by the raceway to be honed; the tool-lifting cam 133—140—141—142 operates, during a complete revolution, to lower the tool 59, after the tool-reciprocating cam has moved it into position, from said horizontal plane into contact with the raceway to be honed, and to raise the tool back to said horizontal plane before said tool begins its lateral return to inoperative position, this lowering and raising of the tool being independent of the carriage 20 but dependent upon the carrier 38; the pressure roller-lifting cam 134—143—144—145 operates, during a complete revolution, to lower the pressure roller 84 (if same is employed) into external engagement with the new work piece 80 before the tool 59 begins its honing operation and to remain lowered until after the honing has been completed; and, the kicker-tripper cam 135—146—147—148 operates, during a complete revolution, to eject the honed work piece and permit the introduction of a new work piece while the pressure roller 84 is in raised position and the tool 59 is laterally and vertically spaced from honing position.

In Fig. 5, wherein the carriage 38 is shown in lowered position because of the inoperative position of the cam 133—140—141—142 with respect to the roller 122, it will be noted that a slight clearance is provided between the lower end of the screw 46 and the upper surface of the stem head 29. This means, looking at Fig. 6, that the tool 59, when in honing position, is held against the raceway being honed through the agency of the spring 44 and is not otherwise positively held, this being for the reason that it is not desirable, in honing operations, to hold to any size or raceway diameter.

The speed at which the tool 59 may be reciprocated (by the eccentric 62) is practically unlimited because such reciprocation is exclusive of the carriage 20 and carrier 38, the only members necessary to be reciprocated being the tool itself and its direct support 53—58.

The support and actuating mechanism for the pressure roller 84, the roller itself and its function, may be dispensed with in the case of internal honing and should be, as will later be seen, in the case of external honing. As shown most clearly in Fig. 8, the work piece 80 is supported on the rollers 73 against the backing member 77 at an angle to the horizontal or axis of the tool 59. In this position of the work piece, the honing surface of the tool and the opposing surfaces of the driving rollers define a converging space which receives and confines the work piece and prevents axial displacement of the latter from the backing member. At the same time, the tool itself exerts a resilient force downwardly against the surface of the work to be honed and the resultant of this force establishes a counter-clockwise movement which further tends to hold the work piece against the backing member, especially against the tipping of said piece away from said member. Since the tool is resiliently held against the work, little reliance is placed upon the ability thereof to hold said work in driven engagement with the rollers 73, and instead, the rollers themselves are substantially exclusively relied upon for performing this function. As shown in Fig. 21, the closer the angle at the work piece center approaches a straight angle (by selectively reducing the diameters of the rollers from those shown at 73 to those shown at 73a), the smaller becomes the angle at either of the roller centers, which means the closer to unity becomes the cosine of the latter angle and, as a result, the greater the driving force of the rollers is upon the work piece 80a. Therefore, the showing in and discussion of Fig. 21 prove the lack of necessity for a pressure roller, such as 84, to insure rotation of the work piece, and the showing in and discussion of Fig. 8 prove that the work piece is satisfactorily maintained in proper position against the backing member in the manner described in this paragraph and without the employment of any other means.

As has been previously described, and as is disclosed in Figs. 1 through 11 wherever possible, the axes of the shafts 70 and 71 which carry the work-driving rollers 73 and of the shaft 81 or pin which carries the pressure roller 84 (if the employment of the latter is desired) are parallel, though it is contemplated (and subsequently described) that said axes may be arranged out of parallelism. Therefore, the apparatus so far described and which is adaptable for honing the internal raceways of roller bearing cup members utilizes a centerless support for said members which in any event comprises the backing member 77 and the work-driving rollers 73 and which, if desired, may include the pressure roller 84, the axes of said rollers, for the sole purpose of illustrating one form of the apparatus, being parallel.

Figures 12, 13, 14, 15, 18, 19:
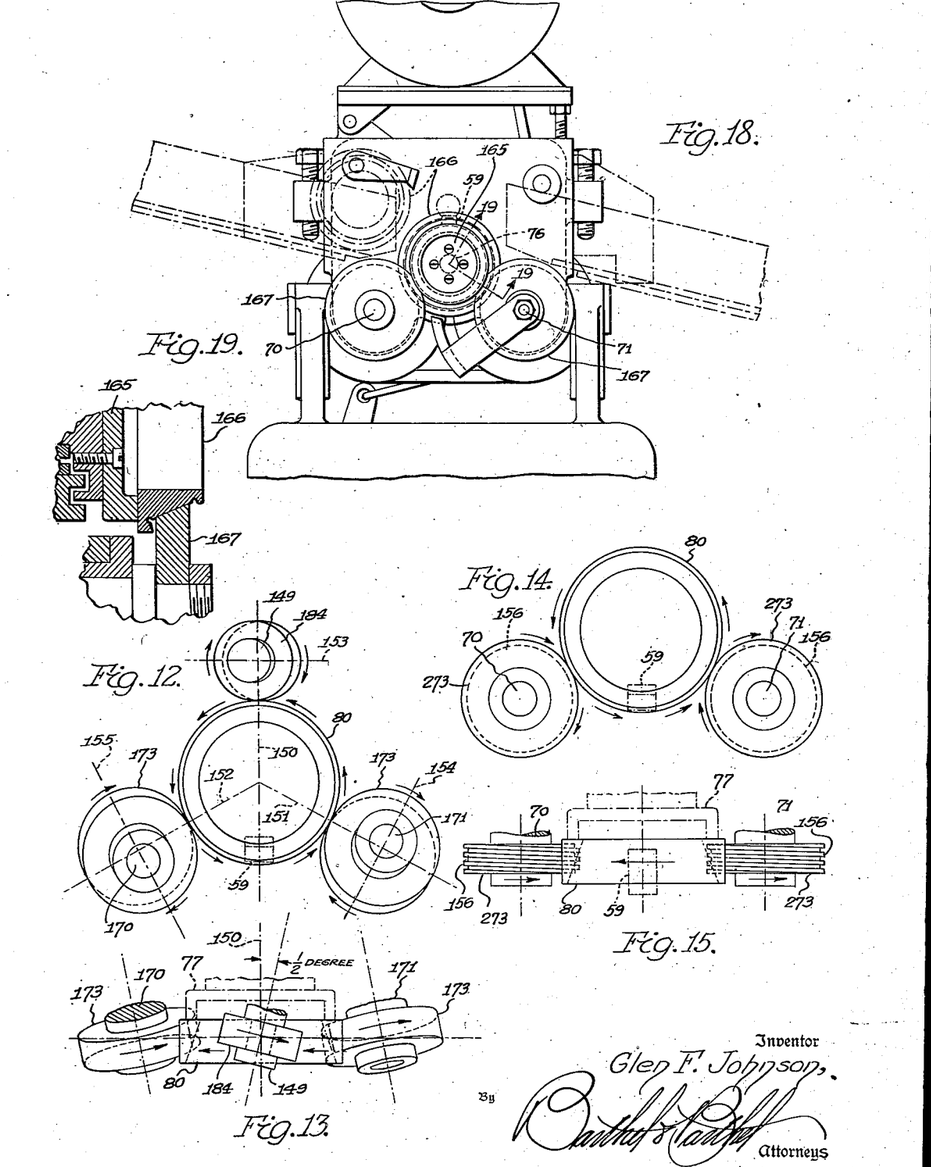
Figs. 12 and 13 are detailed elevational and plan views, respectively, of one form of support for the work piece which may be employed in a centerless type of honing apparatus similar to that shown in the previous figures.
Figs. 14 and 15 are views similar to Figs. 12 and 13 but showing another possible form of work piece support.
Fig. 18 is a right end elevational view of the work-carrying end of the apparatus shown in Fig. 16.
Fig. 19 is a sectional view taken along the lines 19—19 in Fig. 18.

The centerless support for the cup members 80 which employs the backing member 77 and the work-driving rollers 73 without the pressure roller 84 and in which the rolling surfaces of said rollers 73 are plain and the axes of shafts 70, 71 and 76 parallel, or the support which employs said pressure roller and in which the axis of its supporting shaft 81 is parallel with said shafts 70, 71 and 76, may be replaced by the arrangement shown in Figs. 12 and 13. In these figures, the rolling surfaces of the rollers 173 and 184 (similar to the rollers 73 and 84) are plain, the axes of their shafts 170, 171 and 149 (shafts 170 and 171 being driven in a manner similar to shafts 70 and 71, and shaft 149 representing the pin or shaft which directly supports the roller 184 and is carried by the pressure arm 83) are arranged out of parallelism, and the work piece 80 is effectively held between the rollers 173 and 184 against the backing member 77. In Fig. 12, which figure is a view looking in the same direction as Fig. 2, that is, looking at the work-carrying section 12 of the apparatus from right to left, three planes 150, 151 and 152 are designated, plane 150 being coincident with the axis of the work piece 80 and passing through the point of contact between the roller 184 and said work piece, plane 151 being also coincident with the axis of said work piece and passing through the point of contact between said work piece and one of the rollers 173, and plane 152 being also coincident with the axis of said work piece and passing through the point of contact between said work piece and the other roller 173. Three other planes 153, 154 and 155 are also designated in Fig. 12, plane 153 being coincident with the axis of shaft 149 and normal to the plane 150, plane 154 being coincident with the axis of shaft 171 and normal to the plane 151, and plane 155 being coincident with the axis of shaft 170 and normal to the plane 152. Then referring to Fig. 13, which is a plan view of Fig. 12, it will be noted that the axis of shaft 149, though lying in plane 153, intersects the plane 150 at an angle of more or less half a degree, that the axis of shaft 171, though lying in plane 154, intersects the plane 151 at a similar angle, and that the axis of shaft 170, though lying in plane 155, intersects the plane 152 at a similar angle.

Due to the above described arrangement of the shafts 170, 171 and 149 with respect to each other and to the axis of the work piece 80, it will be seen that there is a point contact established between the work piece and the roller 173 carried by the shaft 170, a point contact established between the work piece and the roller 173 carried by the shaft 171, and a point contact established between the work piece and the roller 184 carried by the shaft 149. It will also be seen that, with the rollers rotating in the directions indicated, these point contacts tend to force and maintain the work piece 80 against the backing member 77.

Though the centerless support for the bearing cups which is shown in Figs. 12 and 13 has been described as including the pressure roller 184, the latter may, if desired, be dispensed with without impairing to any great extent the utility and effectiveness of the resulting support.

Another form of centerless support for the work piece 80 is shown in Figs. 14 and 15 wherein the shafts 70 and 71 are arranged in parallelism with the axis of said work piece, as in the form of support shown in Figs. 1 through 11, but wherein said shafts, instead of carrying plain rollers, carry externally threaded rollers 273, this new form of support eliminating all need for a pressure roller and providing an effective driving support for the work piece. As shown, the rollers 273 (driven similarly as rollers 73 and 173) are driven each in a clockwise direction (looking at the work-carrying end of the apparatus from the tool-carrying end), and each is provided externally with a left-hand screw formation 156. The effect of the contact between the screw thread formations 156 and the external surface of the work piece 80 is, in the presence of a speed differential between the rollers 273 and said work piece, to urge and maintain the work piece against the backing member 77, and this speed differential is caused by the braking action of the tool 59 upon the raceway of the work piece, by the slippage at the pulleys 72, or by an intentional running of the shafts 70 and 71 at different speeds, though the differential arising from either or both of the first two mentioned sources is usually sufficient to give effect to the screw threaded portions 156 in holding the work piece in the position desired therefor against the backing member 77. Another feature arising from the provision of the portions 156 is the polishing, to an appreciable degree, of the external surface of the work piece by the wiping action thereupon by said portions.

When the apparatus is to be used, therefore, in the honing of the internal raceways of roller bearing cup members, any one of many choices of centerless supports for the work may be made. The support may comprise the shafts 70, 71 and 76 which are parallel with each other and with the axis of the work piece, the plain rollers 73 and the backing member 77 which are carried by said shafts, and it may or may not include the pressure roller 84 and its support which would, if employed, be parallel with said axis. Another pair of choices is where the support comprises the shafts 70, 71 and 76 which are parallel with each other and with the axis of the work piece, the threaded rollers 273 and the backing member 77 which are carried by said shafts, and it preferably does not include the pressure roller 84 and its support though such may be employed if desired. Still another pair of choices is where the support comprises the shafts 170 and 171 which are out of parallelism with each other and with the axis of the work piece and which carry the plain rollers 173, the shaft 76 which carries the backing member 77 and the axis of which is parallel with the axis of the work piece, and it may or may not include the plain roller 184 and its support 149 which, if employed, would be out of parallelism with the shafts 170, 171 and 76. It should be noted that, when non-parallel shafts are employed, the rollers have plain surfaces, which means, said another way, that the threaded rollers 273 are preferably not employed unless the shafts are parallel with each other and with the axis of the work supported thereby.

Figure 8:
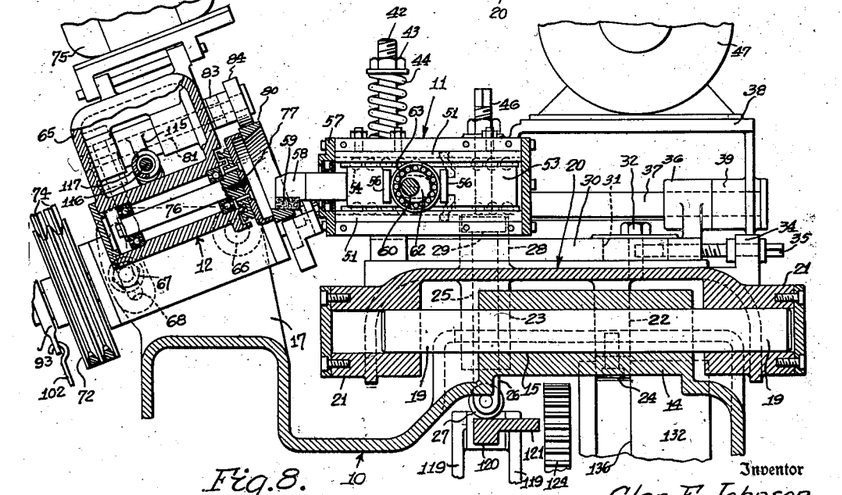
Fig. 8 is a sectional view taken along the lines 8—8 in Fig. 7.
Figure 16:
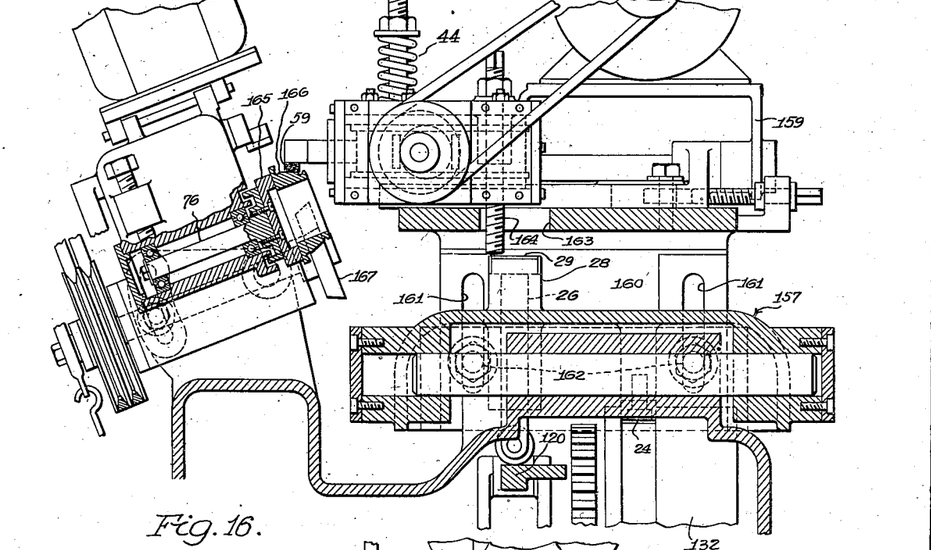
Fig. 16 is a view similar to Fig. 8 but showing the honing apparatus slightly modified for rendering same capable of honing external surfaces rather than internal surfaces.
Figure 17:
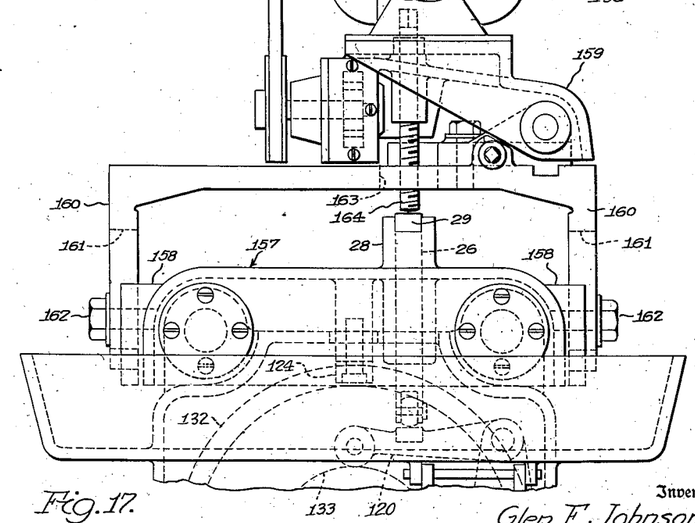
Fig. 17 is a right end elevational view of the showing in Fig. 16.

The apparatus shown in Figs. 16 through 19 is adapted for honing the external raceways of roller bearing cone members and its close similarity to the apparatus employed for honing the internal raceways of roller bearing cup members is readily seen by comparing Fig. 16 with Fig. 8, Fig. 17 with Fig. 5, and Fig. 18 with Fig. 2, which means that the latter mentioned apparatus may be readily and easily modified so as to present the form and structure of the former mentioned apparatus and to operate similarly thereas.

The carriage which is generally indicated at 157 and which corresponds with the carriage 20 is reciprocated toward and from the work-carrying end of the apparatus in a similar manner, by similar means and for a similar purpose as said carriage 20. The carriage 157 is supported similarly as the carriage 20 but is structurally different therefrom in that the former has provided on its front and rear walls means, such as recessed bosses 158, whereby the carrier 159 which corresponds with the carrier 38 may be adjustably supported to enable said carrier 159 to attain the elevation necessary for the work to be done thereby.

The carrier 159 carries the tool 59 in the same manner, by the same means and for reciprocation with respect to itself, as in the case of the carrier 38. The reciprocation of carrier 159 and carriage 157 is normally unitary, as in the case of carrier 38 and carriage 20. The lateral position of the carrier 159 is selectively adjustable with respect to the carriage 157, as in the case of the carrier 38 and carriage 20. Structurally, however, the carrier 159 is different from the carrier 38 in that the base of said carrier 159 is formed with front and rear means, such as downwardly extending wall members 160, which cooperate with the recesses in the bosses 158 and guide the movement of the carrier 159 toward and from the carriage 157 in a purely vertical direction. Each of the wall members 160 is provided with means, such as a pair of laterally spaced and vertically parallel slots 161, which cooperably receive other means, such as bolts 162 which threadedly engage the carriage 157, for vertically adjusting and maintaining the selected position of the carrier 159 with respect to the carriage 157. The base of the carrier 159 is also formed with a longitudinal slot 163 through which a set screw 164 extends to be in driven engagement with the head 29 of stem 26, the tilting of the carriage 159 by the upward movement of the stem 26 being similar as the tilting of the carrier 38 by said stem 26. Because of the necessary difference in height of the two carriers 159 and 38, the set screw 164 is longer than the set screw 46, but this difference in length is the only structural difference, the set screws operating and being driven the same way in either case. It will be noted that the same clearance exists between the screw 164 and head 29 as exists between the screw 46 and head 29.

It is clear that, if it is desired to lower the carrier 159 for the purpose of rendering the apparatus disclosed in Figs. 16 through 19 operable for honing cups rather than cones, the bolts 162 are loosened, the screw 164 is turned into an upper position, and the base of the carrier 159 is moved downwardly into desired position, the slot 163 cooperating with the boss 28 on the carriage 157 to permit this downward movement.

And now referring to the work-carrying section of the apparatus disclosed in Figs. 16 through 19, the only differences between said section and the corresponding section illustrated in Figs. 1 through 11 will now be pointed out. In the first place, a pressure roller is not employed because the pressure of the tool 59 replaces the pressure of the roller. In the second place, the backing member 165 has perhaps a smaller diameter than the backing member 77 because the cone 166 has a smaller diameter than its corresponding cup 80. In the third place, the axes of the shafts 70, 71 and 76 are in parallelism with each other and with the axis of the cone 166. In the fourth place, the driving rollers 167 which are carried by the parallel shafts 70 and 71 are plain and conically surfaced, rather than cylindrically surfaced as in the cases of the rollers 73, 173 and 273, in order that the cones 166 will be properly accommodated and supported thereby. And, in the fifth place, the tool 59 presses upon (by the force of the spring 44) and reciprocates over the external surface of the cone 166 at the top thereof. Other than these exceptions the two forms of work-carrying sections are identical, so that the interchangeability thereof with merely slight modifications is readily seen.

Although the invention has been described with some detail it is not intended that such description is to be definitive of the limits of the inventive idea. The right is reserved to make such changes in the details of construction and arrangement of parts as will come within the purview of the attached claims.

What I claim is:

1. In a machine having a work supporting structure for rotatably supporting a work piece having an annular surface to be honed, a supporting structure for a honing tool comprising, a carriage reciprocable along a given path, a support carried by said carriage for movement therewith, means interconnecting said carriage and said support to permit the latter to reciprocate relatively to said carriage, a carrier having front, rear and intermediate sections the first-named of which is adapted for carrying the tool in contact with the work piece surface, means interconnecting said support and said rear section to adapt said carrier for reciprocation with said support and for movement relatively to the latter pivotally about an axis parallel with said path, an elongated member fixed at one of its ends to said support and extending upwardly therefrom through an aperture provided therefor in said intermediate section, a spring arranged about said member between said intermediate section and the opposite end of said member for resiliently urging said carrier in one direction about said axis, and means cooperable with said carrier and operable at predetermined intervals for moving the latter in opposition to said spring in the opposite direction about said axis.

2. In a machine having a work supporting structure for rotatably supporting a work piece having an annular surface to be honed, a supporting structure for a honing tool comprising, a carriage reciprocable along a given path, a support carried by said carriage for movement therewith, means interconnecting said carriage and said support to permit the latter to reciprocate relatively to said carriage, a carrier having front, rear and intermediate sections the first-named of which is adapted for carrying the tool in contact with the work piece surface, means interconnecting said support and said rear section to adapt said carrier for reciprocation with said support and for movement relatively to the latter pivotally about an axis parallel with said path, an elongated member fixed at one of its ends to said support and extending upwardly therefrom through an aperture provided therefor in said intermediate section, the upper end of said member having abutment means thereon, a spring arranged about said member between said intermediate section and said abutment means for resiliently urging said carrier in one direction about said axis, and means cooperable with said carrier and operable at predetermined intervals for moving the latter in opposition to said spring in the opposite direction about said axis.

3. In a machine having a work supporting structure for rotatably supporting a work piece having an annular surface to be honed, a supporting structure for a honing tool comprising, a carriage reciprocable along a given path, a support carried by said carriage for movement therewith, means interconnecting said carriage and said support to permit the latter to reciprocate relatively to said carriage, a carrier having front, rear and intermediate sections the first-named of which is adapted for carrying the tool in contact with the work piece surface, means interconnecting said support and said rear section to adapt said carrier for reciprocation with said support and for movement relatively to the latter pivotally about an axis parallel with said path, an elongated member fixed at one of its ends to said support and extending upwardly therefrom through an aperture provided therefor in said intermediate section, the upper end of said member having abutment means thereon adjustably movable therealong, a spring arranged about said member between said intermediate section and said abutment means for resiliently urging said carrier in one direction about said axis, and means cooperable with said carrier and operable at predetermined intervals for moving the latter in opposition to said spring in the opposite direction about said axis.

GLEN F. JOHNSON.